June 1, 1926.
G. H. RIEBETH
BATTERY
Filed Oct. 29, 1921
1,587,356
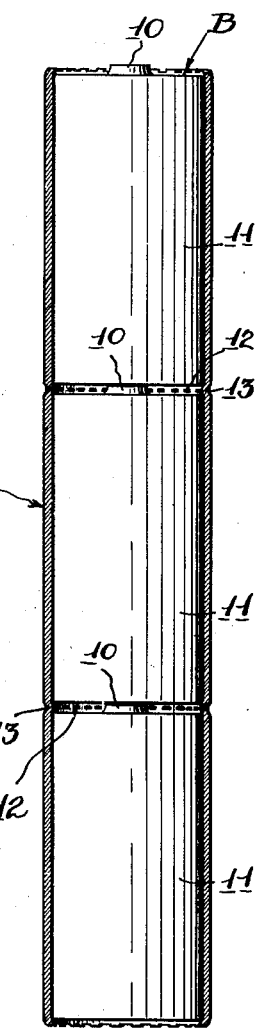
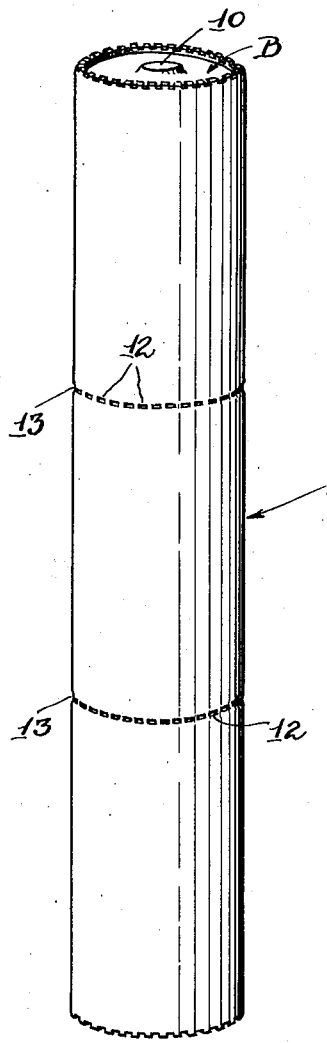
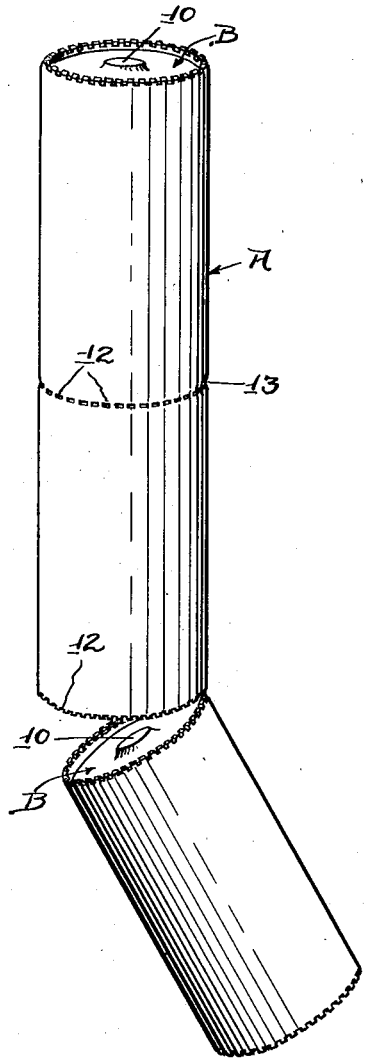
Inventor
George H. Riebeth
By Bradbury + Caswell
Attorneys Patented June 1, 1926.

1,587,356

UNITED STATES PATENT OFFICE.

GEORGE H. RIEBETH, OF MINNEAPOLIS, MINNESOTA, ASSIGNOR TO FRENCH BATTERY COMPANY, OF MADISON, WISCONSIN, A CORPORATION OF WISCONSIN.

BATTERY.

Application filed October 29, 1921. Serial No. 511,420.

My invention relates to improvements in batteries.

The tubular dry battery consisting of one or more cells or battery cores encased in an insulating paper tube is a type of battery in constantly increasing demand. Dealers find it necessary to carry batteries of given diameters in various lengths, viz: batteries including one, two, three or more cells as conditions may require. A stock of batteries even roughly meeting the various demands therefor is large and necessarily expensive. Batteries of those sizes least in demand deteriorate on the shelf and result in losses to the user and to the dealer.

Broadly, it is the object of my invention to provide a battery readily convertible into various shorter lengths, whereby a dealer may carry a limited and unimpaired stock and at the same time be enabled to supply the various demands.

More specifically, my object is to provide a battery comprising a plurality of cells and a jacket of insulating material, designed to contain said cells, end to end, said jacket being adapted to be conveniently severed on circumferential lines between the cells, whereby, two or more batteries may be supplied, the same varying, as desired, in the number of cells embodied therein.

With the foregoing and other objects in view, which will appear in the following description, the invention resides in the novel combination and arrangement of parts and in the details of construction hereinafter described and claimed.

In the drawings, Fig. 1 is a perspective view of a battery embodying my invention; Fig. 2 is a longitudinal central sectional view thereof and Fig. 3 is a view similar to Fig. 1, the lower section of the battery being shown as partially severed from the upper portion thereof.

Referring to the drawings, I have used the reference letter A to indicate the jacket for a plurality of cells B.

The cells B are of usual construction and are fitted, end to end, within the jacket A, the carbon post 10 of one cell contacting with the bottom of the zinc can 11 of the adjacent cell.

The jacket A is perforated on circumferential lines, as at 12, between the cells B. By thus weakening the jacket, it may be broken into two or more parts, each part encasing one or more cells, the edges thereof being protected by overlapping portions of the jacket. While I prefer to weaken the jacket A on circumferential lines by perforating the same, it will be understood, that other methods may be employed within the scope of my invention. For example, internal or external annular scoring of the jacket may be adopted. Another method would consist of forming separate jacket sections for the cells B and joining the same end to end in a unitary tube, by means of a label or other binder embracing two or more of the jacket sections. The perforations 12, scorings or joints between jacket sections, as the case may be, are formed in annularly depressed zones or ribs 13 in the jacket A. These ribs may be formed simultaneously with the perforating, scoring or severing processes, or otherwise, and serve to yieldingly retain the cells B against slippage in the jacket A. This feature is advantageous for two reasons. It guards against exposure of the cells B and holds the cells in such positions within the jacket that the lines of severance register with the spaces between said cells.

In practice, my batteries are made up in various lengths. A dealer with a limited stock is able to supply the demand for batteries of single units or of various multiple units by having in stock a battery or batteries consisting of units in the highest number desired. Assuming that a dealer's supply of double unit batteries has become exhausted, it is only necessary to break one unit from a three unit battery to supply the demand for double units. The same process supplies a single unit battery when that stock is depleted. It will thus be seen, that I supply a readily convertible battery by which any of the various needs can be met from a limited stock. The fact that battery stocks can be so limited aids materially in supplying fresh and unimpaired batteries to the trade.

Changes in the specific form of my invention, as herein disclosed, may be made within the scope of what is claimed without departing from the spirit of my invention.

Having described my invention, what I claim as new and desire to protect by Letters Patent is:

A battery including a plurality of cells and a tubular jacket containing said cells end to end, said jacket having internal annular ribs pressed therein between said cells, said ribs being weakened annularly to provide definite lines of severance in the jacket between the cells, the ribs holding the cells in place within the unbroken jacket and the portions of said ribs on severed sections of the jacket holding the contained cells therein.

In testimony whereof, I have signed my name to this specification.

GEORGE H. RIEBETH.